UNITED STATES PATENT OFFICE.

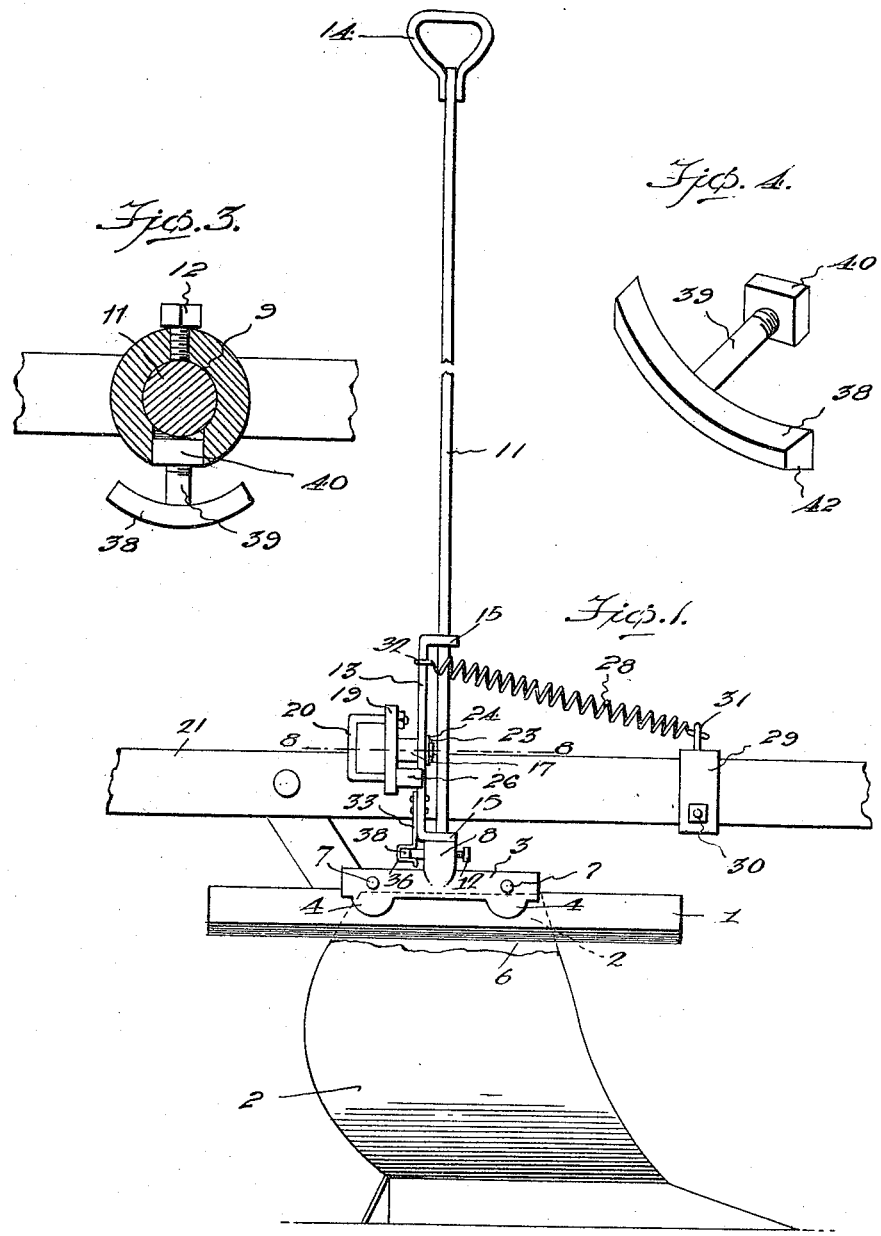

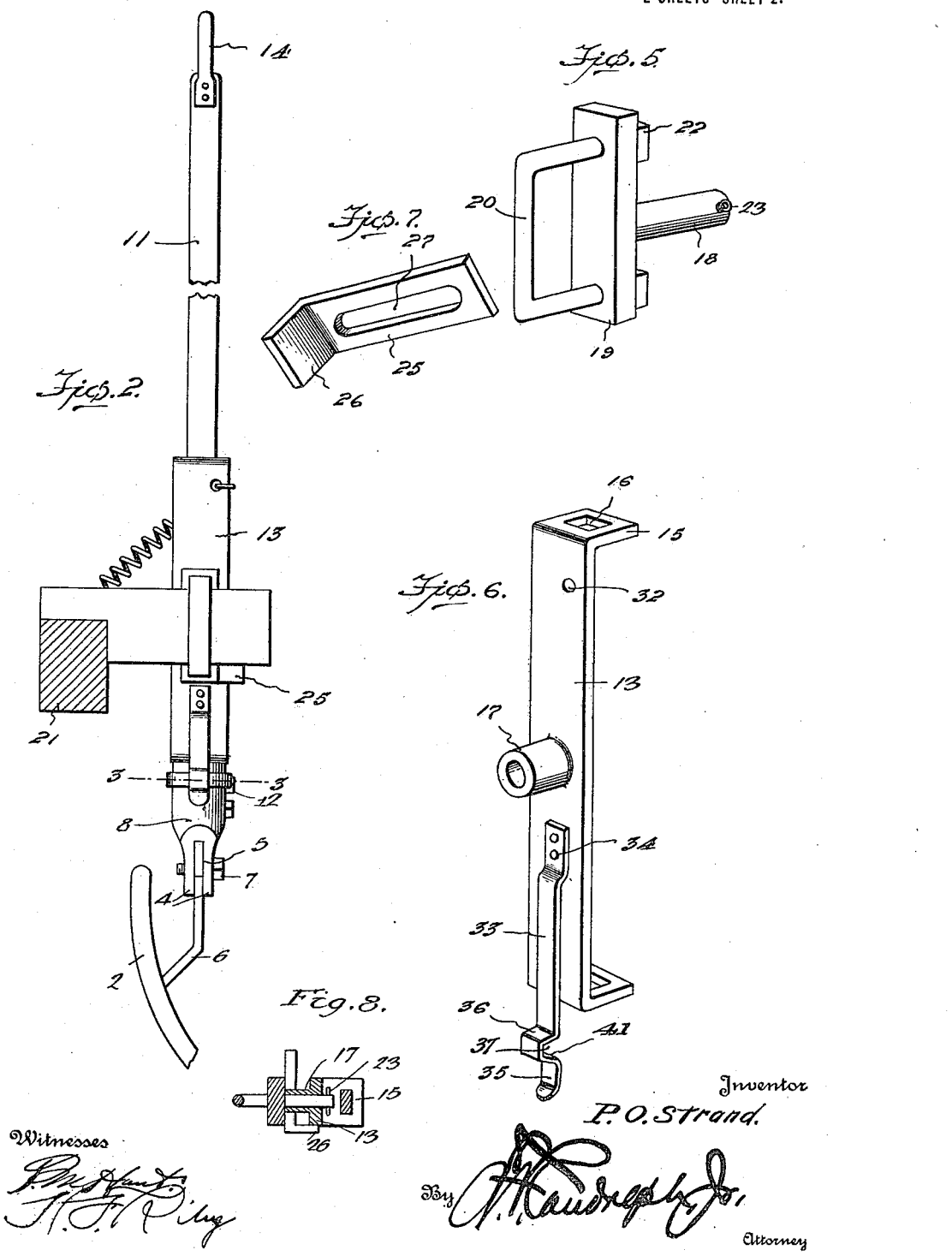

PEDER O. STRAND, OF MINNEWAUKAN, NORTH DAKOTA.

MOLDBOARD-SCRAPER FOR PLOWS.

1,209,354.   Specification of Letters Patent.   Patented Dec. 19, 1916.

Application filed March 3, 1915.   Serial No. 11,705.

*To all whom it may concern:*

Be it known that I, PEDER O. STRAND, a citizen of the United States, residing at Minnewaukan, in the county of Benson and State of North Dakota, have invented certain new and useful Improvements in Moldboard-Scrapers for Plows; and I do hereby declare the following to be a full, clear, and exact description of the invention, such as will enable others skilled in the art to which it appertains to make and use the same.

This invention relates to a mold board scraper for plows.

The object of the present invention is to improve the construction of mold-board scrapers for plows and to provide a simple, inexpensive and efficient mold board scraper of strong and durable construction, designed for use on gang plows, sulky plows and similar agricultural implements and capable of being easily and quickly operated to scrape and clean mold boards.

A further object of the invention is to provide a mold board scraper of this character equipped with scraping means capable of ready adjustment to properly engage the surface to be cleaned and adapted to be readily moved upward and downward by the operator and provided also with means for yieldably maintaining it in engagement with a mold board during the downward movement and for automatically locking it in an elevated position at the limit of its upward movement.

With these and other objects in view the invention consists in the construction and novel combination and arrangement of parts hereinafter fully described, illustrated in the accompanying drawings and pointed out in the claims hereto appended, it being understood that various changes in the form proportion and minor details of construction may be resorted to without departing from the spirit or sacrificing any of the advantages of the invention.

In the drawings Figure 1 is a side elevation of a mold board scraper constructed in accordance with this invention and shown applied to a portion of a plow, Fig. 2 is an end elevation of the same, the plow frame being in section, Fig. 3 is a detail horizontal sectional view taken substantially on the line 3—3 of Fig. 2, parts being omitted, Fig. 4 is a detail perspective view of the bolt having the curved head for engaging the spring catch, Fig. 5 is a detail perspective view of the clip for mounting the device on a frame, Fig. 6 is a detail perspective view of the adjustable guides. Fig. 7 is a detail view of the adjustable thumb plate. Fig. 8 is a longitudinal sectional view, taken on the line 8—8 of Fig. 1.

Like numerals of reference designate corresponding parts in all the figures of the drawings.

In the accompanying drawings in which is illustrated the preferred embodiment of the invention, 1 designates a scraper blade adapted to engage and clean the face of a mold board 2 of a sulky plow, gang plow or similar agricultural implement and mounted in a head or holder 3 having spaced sides or jaws 4 and an intervening slot or opening 5 to receive and clamp the blade 1. The blade 1 which may be constructed of any suitable material is preferably provided at its lower edge with an inclined engaging portion or flange 6 as clearly illustrated in Fig. 2 of the drawings. The sides or jaws of the holder are maintained firmly in engagement with the scraper blade 1 by means of clamping screws 7 which adjustably connect the sides or jaws of the head or holder 3. The head or holder 3 is provided at the center with an upwardly extending socket 8 formed integral with the body portion of the head or holder and provided with an opening 9 for the reception of a reduced lower terminal portion or shank of a vertically movable rod or bar 11 which is secured to the socket 8 by a clamping screw 12 but any other suitable means may of course be employed for this purpose. The rod or bar which is mounted in a guide bracket 13 is movable upwardly and downwardly to operate the scraper blade 1 and provided at its upper end with a handle 14 which may be of any suitable form.

The guide bracket consists of a bar or body portion provided at the top and bottom with lugs or flanges 15 having alined guide openings 16 for the reception of a rod or bar 11 which is guided in its movement by the bracket 13. The bracket 13 is provided at its center or other convenient point with a horizontal or substantially horizontal bearing sleeve 17 which is mounted on an approximately horizontal stud 18 projecting from the center of the clip plate 19 of a clip consisting of the clip plate 19 and a U-bolt 20 which is adapted to embrace one of the bars or members 21 of the frame of the plow to which the device is applied.

The bolt 20 is equipped at its threaded end with nuts 22 for engaging the clip plate 19. The clip is adapted to firmly engage the frame of the plow and the bearing sleeve 17 of the guide bracket is retained on the stud 18 by a cotter pin 23, a collar 24 being preferably interposed between the cotter pin and the bracket. The stud forms a pivot for the bearing bracket to enable the rod or bar 11 which carries the scraper to be rocked and arranged at the proper angles for engaging the mold board 2. The pivotal or rocking movement of the guide bracket is limited in one direction by an adjustable thumb plate 25 so that the scraper in its downward movement will engage the mold board slightly below the upper edge thereof. The adjustable thumb plate 25 which is secured to the clip by the lower leg of the U-bolt is provided at one end with a flange 26 which forms a stop or abutment for the lower portion of the pivoted guide bracket as clearly illustrated in Fig. 1 of the drawings. The body portion of the plate is provided with a longitudinal slot 27 which permits an adjustment of the stop plate to enable the scraper blade to be positioned properly with relation to the mold board. The scraper blade is normally held from engagement with the mold board by means of a coiled spring 28 connected at one end to the upper portion of the guide bracket and secured at its lower end to a fixed bracket 29 of approximately U-shape secured to the frame of the plow by a bolt 30 and provided at the top with a lug 31 to which the lower end of the spring 28 is secured. The upper end of the spring 28 is secured in a perforation 32 of the guide bracket.

The spring which is placed under the desired tension by the adjustment of the relatively fixed bracket 29 maintains the lower portion of the guide bracket in contact with the flange of the stop plate when the scraper is elevated.

The scraper is held in an elevated position by means of a spring catch 33 secured at its upper end 34 to the lower portion of the guide bracket and extending downwardly below the same. The catch is provided at its lower end with a curved portion or lip 35 and it has a rectangular bend 36 at the upper end of the lip to form an approximately rectangular recess 37 to engage a curved head 38 of a bolt 39. The bolt 39 engages a nut 40 which is mounted in a side recess or opening in the socket 8 of the head or holder of the scraper blade. The arcuate head 38 constitutes the rigid member of the locking means and it is adapted when the scraper is raised to engage the spring catch automatically, the depending curved lip 35 permitting the head 38 to flex the spring catch and engage the recess 37. The lower portion 41 of the bend 36 is arranged at a slight inclination and the lower edge 42 of the arcuate head 38 is slightly beveled or inclined to enable the head to be readily sprung out of engagement with the catch when sufficient pressure is exerted on the rod or bar 11 in forcing the scraper downwardly. By this construction the catch is automatic in engaging and in releasing the head 38.

What is claimed is:—

1. A device of the class described including a rod or member movable upwardly and downwardly and provided at the lower portion with a scraper blade, a pivotally mounted bracket guiding the bar or rod in its upward and downward movement, a stop plate for limiting the pivotal movement of the bracket and a spring connected with the bracket for urging the same toward the stop plate.

2. A device of the class described including a clip having a pivot stud and adapted to be mounted on the frame of a plow, a guide bracket pivoted to the clip by the said stud, a slidable rod or bar guided by the said bracket and movable upwardly and downwardly and a scraper carried by the rod or bar and arranged to engage a mold board.

3. A device of the class described including a clip adapted to engage the frame of a plow and provided with a stud or pivot, a guide bracket connected to the clip by the stud or pivot, a rod or bar movable upwardly and downwardly and guided by the said bracket, said bar being provided with means for engaging and cleaning a mold board, an adjustable stop plate mounted on the clip and arranged to limit the movement of the guide bracket in one direction and a spring connected with the guide bracket for urging the same against the stop.

4. A device of the class described including a clip adapted to engage a plow beam, a bracket pivotally mounted on the clip, a bar or member guided by the bracket and provided with means for engaging and cleaning a mold board, a spring connected with the bracket for urging the scraping means in engagement with the mold board and an adjustable bracket provided with means for engaging the frame of the plow and connected with the said spring for varying the tension thereof.

5. A device of the class described including guiding means, a bar or member mounted in the guiding means and movable upwardly and downwardly and provided with a scraper blade and a catch arranged to automatically engage with means carried by the rod or bar for supporting the blade in an elevated position.

6. A device of the class described including a guide bracket, a rod or bar slidable in the bracket, scraping means carried by the rod or bar, a spring catch mounted on the bracket and means carried by the rod or bar and arranged to engage the spring catch for supporting the rod or bar in an elevated position.

7. A device of the class described including a pivotally mounted bracket, a vertically movable rod or bar guided in the bracket and provided with scraping means, a spring catch mounted on the bracket and a bolt or member carried by the rod or bar and provided with an arcuate head arranged to engage with the spring catch for holding the said rod or bar in an elevated position.

In testimony whereof I affix my signature in presence of two witnesses.

PEDER O. STRAND.

Witnesses:
I. J. GRANDSEN,
J. A. KOLSRUD.

Copies of this patent may be obtained for five cents each, by addressing the "Commissioner of Patents, Washington, D. C."